P. GERLI AND O. A. ROSS.
SYSTEM OF CARBURATION FOR HYDROCARBON MOTORS.
APPLICATION FILED JAN. 14, 1918.
1,323,264.
Patented Dec. 2, 1919.
3 SHEETS—SHEET 1.
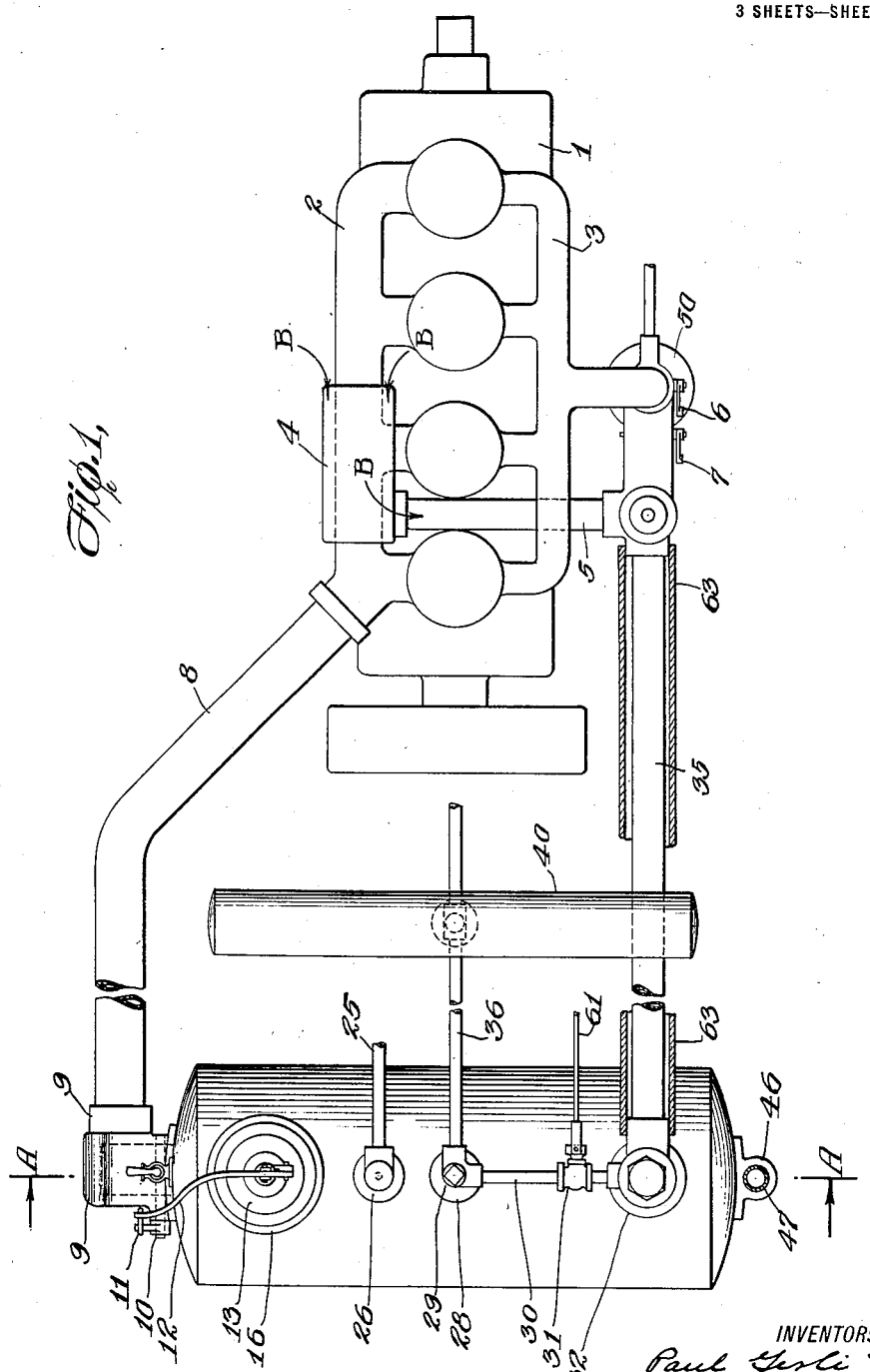
INVENTORS,
Paul Gerli and
Oscar A. Ross,
BY
Kerr, Page, Cooper and Hayward.
ATTORNEYS.

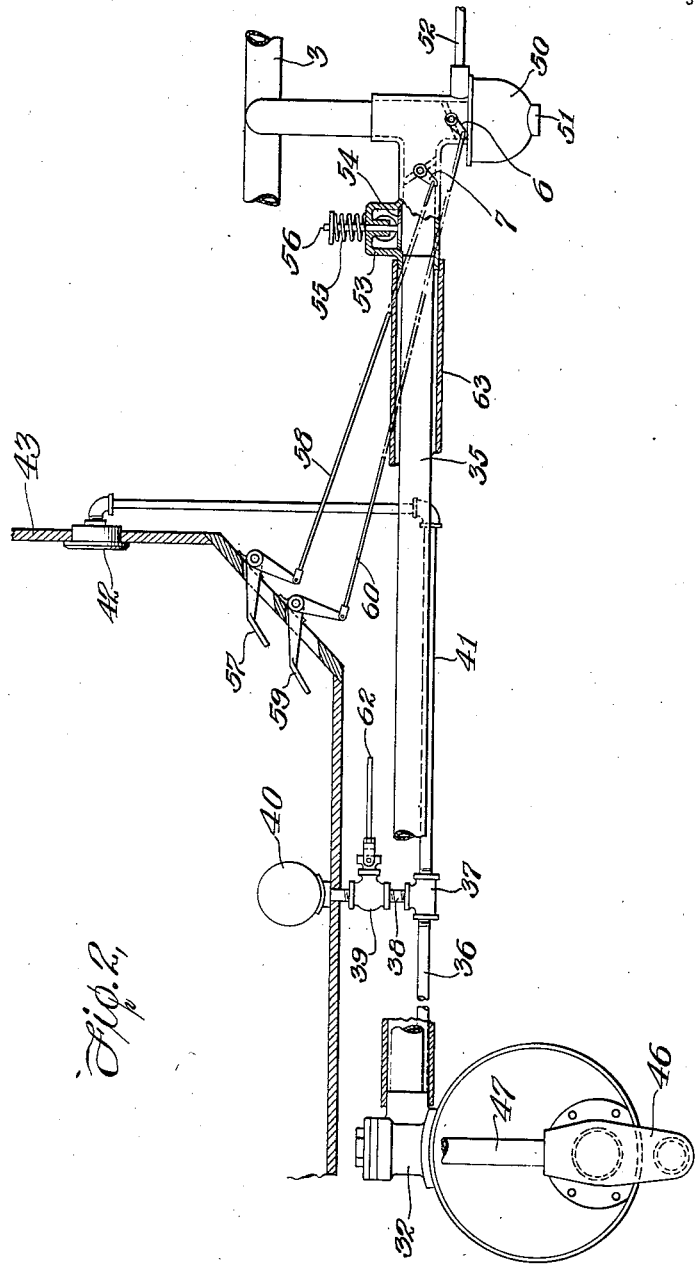

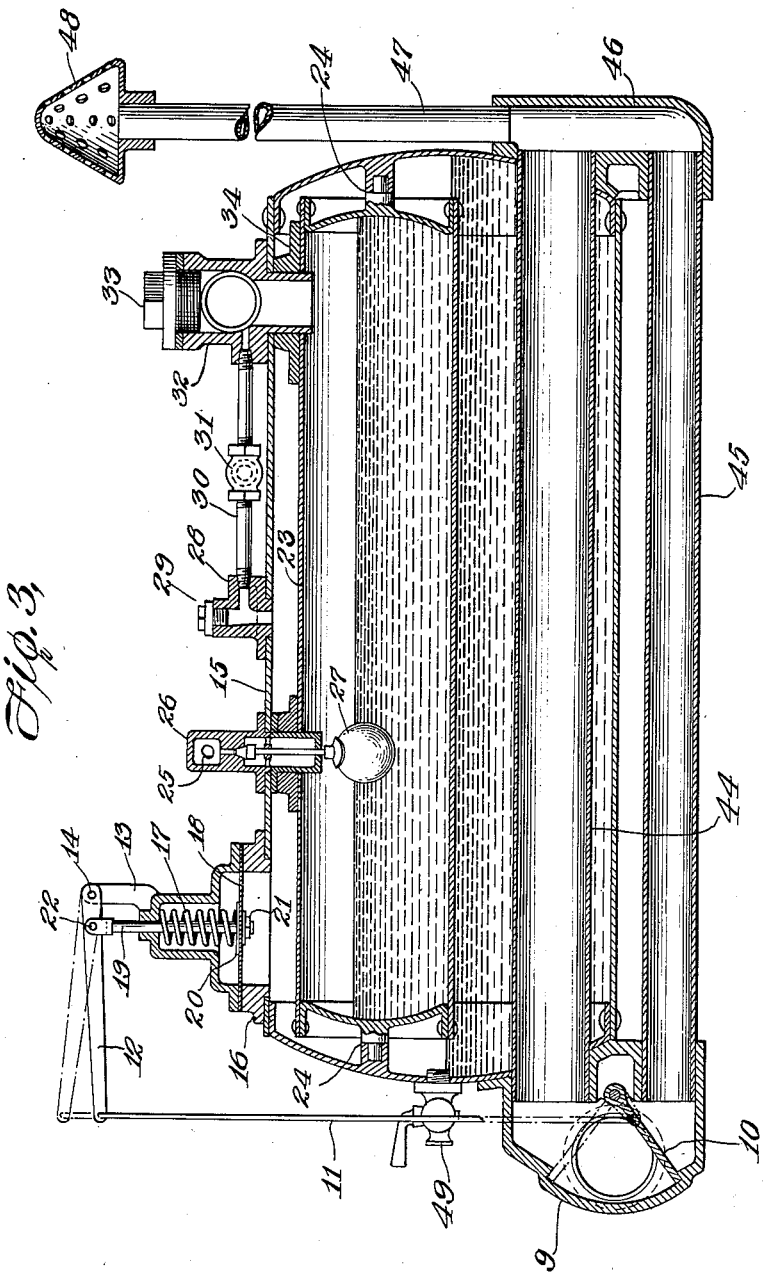

UNITED STATES PATENT OFFICE.

PAUL GERLI AND OSCAR A. ROSS, OF NEW YORK, N. Y.

SYSTEM OF CARBURATION FOR HYDROCARBON-MOTORS.

1,323,264.  Specification of Letters Patent.  Patented Dec. 2, 1919.

Application filed January 14, 1918. Serial No. 211,830.

*To all whom it may concern:*

Be it known that we, PAUL GERLI and OSCAR A. ROSS, citizens of the United States, residing at New York city, in the county of New York and State of New York, have invented a new and useful Improvement in Systems of Carburation for Hydrocarbon-Motors, of which the following is a specification.

Primarily the object of our invention is to employ kerosene, or analogous liquids for use as a fuel in hydro-carbon motors by first converting said liquids into a gas from the heat of the exhaust.

A further object is to provide means by which steam or humid vapor is generated to add to the fuel gases to prevent carbon deposits and increase the efficiency and flexibility of a motor.

A further object is to provide means for heating the interior of the car during cold weather from a source of supply contained within the fuel generating system.

In the accompanying drawings:

Figure 1 is a plan view of our system applied to an automobile showing the parts as they are relatively located on the chassis.

Fig. 2 is a part section, part elevation of the system as illustrated by Fig. 1, showing the control of throttles.

Fig. 3 is a sectional view of the gas generating tank taken on line A—A, of Fig. 1.

Referring to the several figures in the accompanying drawings in which like letters denote corresponding parts in each figure, 1, represents the usual hydro-carbon motor having exhaust manifold 2, and inlet manifold 3. Heater shell 4, connected to pipe 5, surrounds part of exhaust manifold 2, and serves to heat the incoming air which is mixed with the fuel. Throttle 6, controls the gasolene mixture to said motor and throttle 7, the kerosene mixture. Exhaust pipe 8, from manifold 2, terminates in valve housing 9, containing valve or deflector 10, operated by rod 11.

Lever 12, to which rod 11, is pivotally connected is fulcrumed to cap or housing 13, by pin 14. To tank 15, is secured flange 16, to which is bolted housing 13, diaphragm 18, being interposed between. One end of rod 19, is secured to diaphragm 18, by means of washer 20, and nut 21, and the other end is forked and pivotally connected to lever 12, by pin 22. One end of spring 17, impinges against housing 13, and the other end against diaphragm 18.

Fuel tank 23, is suspended in tank 15, by bearings 24. Pipe 25, conveys kerosene, or like oil, from a fuel tank, not shown, to valve 26, controlled by float 27, and thence to tank 23. Into filler flange 28, having filler cap 29, is secured pipe 30, controlled by valve 31, said pipe terminating in gas outlet fitting 32.

Fitting 32, having cap 33, is secured to tanks 15, and 23, flange 34 assisting in forming a tight connection between said tanks, said fitting forming the communication between tank 23, and pipe 35. Surrounding pipe 35, is pipe 63, which forms a caloric insulation preventing cooling of pipe 35.

Also leading from filler flange 28, is pipe 36, terminating in T 37, one branch of which runs upward through pipe 38, controlled by valve 39, to heater 40. The other branch continues in pipe 41, to pressure gage 42, located on dash 43. Branching from valve housing 9, is heater ppe 44, passing through tank 15, and waste pipe 45, passing along the exterior of said tank, both pipes terminating in fitting 46. Fitting 46, is suitably secured to said tank and terminates in outlet pipe 47, fitted with perforated cap 48. Cock 49, serves to denote the proper level for fluid in tank 15.

Gasolene carbureter 50, of any well known make taking air through inlet 51, and gasolene through pipe 52, from a fuel tank, not shown, has two branches, one connecting to inlet manifold 3, and controlled by throttle 6, the other terminating in valve housing 53, having valve 54, under control of spring 55, and adjusting nut 56, said valve controlling the quantity of air from pipe 5, to be mixed with gases from pipe 35.

Within control of the operator's feet is pedal 57, pivotally connected to rod 58, and controlling throttle 7, also pedal 59, connected to rod 60, and controlling throttle 6.

The operation of my system is as follows:—

Water and alcohol in non-freezing proportions are placed in tank 15, to the level shown. Kerosene from pipe 25, fills tank 23, to the level controlled by valve and float 27.

Motor 1, is started on gasolene by operating throttle 6. As no pressure exists in tank 15, when cold, spring 17, acting against housing 13, forces diaphragm 18, downward conveying with it rod 19, lever 12, rod 11, and valve 10. As the motor starts the exhaust gases pass from pipe 8, to housing 9, and are deflected by valve 10, upward into heating tube 44, and thence to fitting 46, pipe 47, and cap 48, to the atmosphere. As pipe 44 is heated, the liquid in tank 15 is caused to boil thereby generating a pressure which as it builds up causes diaphragm 18, to force rod 19, and valve 10, to a raised position, the limit of which is indicated by the dotted outline as shown. As valve 10, is raised a portion of the hot exhaust gases pass downward through pipe 45, and a balance is finally reached whereby only sufficient gases pass through pipe 44, to maintain the proper pressure in tank 15, for boiling, or gasifying the fuel in tank 23.

When sufficient pressure in tank 15, is established to boil or gasify the fuel in tank 23, and as will be indicated by gage 42, the operator of the car will release pedal 59, and depress pedal 57, thereby opening throttle 7. The motor will now draw gas or vapor from tank 23, through pipe 41, and also heated air from shell 4, indicated by arrows B—B, through pipe 5, and valve 54, to the intake manifold 3, the mixture being governed by the adjusted pressure of spring 55.

To prevent carbonization of cylinders and improve the efficiency and flexibility of the motor the valve 31, controlled by rod 61, is opened to permit steam from tank 15, to mix with gases from tank 23. It is obvious that rod 61, could be operated by foot pedal 57, whereby the gas and steam would be fed simultaneously.

For purposes of heating the car we supply the heater 40, which in cold weather is supplied with steam, or heated vapor from tank 15, under control of valve 39, and rod 62.

It will be obvious that our invention can be equally well adapted to stationary or marine hydro-carbon motors and, further, could use other fuels, as for example, alcohol, and further, we do not wish to limit ourselves to the exact construction herein shown and described, but reserve to ourselves the right to all modifications as properly fall within the sphere and scope of our invention.

We claim as our invention:—

1. A system of vaporizing for hydro-carbon motors comprising, a vessel containing a liquid adapted to be heated by the exhaust of said motor, a fuel vessel adapted to be heated by said liquid in combination with means for automatically maintaining a constant temperature of said liquid, substantially as described.

2. A system of vaporizing for hydro-carbon motors comprising, a vessel containing a liquid adapted to be heated by the exhaust of said motor whereby a pressure is established in said vessel, a fuel contained within said vessel adapted to be gasified by the heat of said liquid in combination with means to automatically maintain a substantially fixed pressure in said vessel, substantially as described.

3. A system of vaporizing for hydro-carbon motors of automobiles, comprising a vessel containing a liquid adapted to be heated by the exhaust of said motors, whereby a pressure is established in said vessel, a fuel contained within said vessel adapted to be gasified by the heat from said liquid for use in said motor in combination with means dependent upon the heat of said liquid for heating the interior of said automobiles, substantially as described.

4. A system of vaporizing for hydro-carbon motors, comprising a vessel containing a liquid adapted to be heated by the exhaust of said motor, whereby a pressure is established in said vessel, a fuel tank in said vessel adapted to be heated by said liquid for gasifying said fuel, in combination with means to combine vapors of said liquid with said gasified fuel whereby the efficiency of said gas as a fuel is improved and carbon deposits are materially reduced in the cylinders of said motor, substantially as described.

5. A system of vaporizing for hydro-carbon motors, comprising a vessel containing a liquid adapted to be heated by the exhaust of said motor, a fuel tank contained within said vessel, means to automatically maintain a fixed quantity of fuel in said tank, in combination with means to automatically maintain a substantially fixed temperature in said vessel, substantially as described.

6. A system of vaporizing for hydro-carbon motors, comprising a vessel containing a liquid, a heater tube within said vessel adapted to receive the exhaust from said motor, a by-pass around said heater, means to deflect said exhaust from said heater tube into the by-pass dependent upon the temperature of the liquid in said vessel in combination with a fuel within said vessel adapted to be gasified by the heat of said liquid for consumption by said hydro-carbon motor, substantially as described.

7. A system of vaporizing for hydro-carbon motors, comprising a tank containing a liquid, a heater tube within said tank, adapted to receive the exhaust from said motor, a by-pass around said heater tube, a valve adapted to deflect said exhaust from said heater tube to said by-pass controlled by the pressure generated within said tank in combination with a fuel tank within said liquid tank adapted to be heated by the liquid or its vapors for gasifying said fuel for consumption in said motor, substantially as described.

8. A system of vaporizing for hydro-carbon motors, comprising a vessel containing a liquid, means for heating said liquid by the exhaust of said motors, a fuel vessel contained within said first named vessel and adapted to be heated by the liquid therein in combination with means for maintaining a substantially fixed temperature of said liquid, substantially as described.

In testimony whereof we, PAUL GERLI and OSCAR A. Ross, have signed our names to this specification this 28th day of December, 1917.

PAUL GERLI.
OSCAR A. ROSS.